(12) United States Patent
Sadakane et al.

(10) Patent No.: US 11,097,516 B2
(45) Date of Patent: Aug. 24, 2021

(54) LAMINATED GLASS

(71) Applicant: AGC Inc., Chiyoda-ku (JP)

(72) Inventors: Shunsuke Sadakane, Tokyo (JP); Tokihiko Aoki, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 346 days.

(21) Appl. No.: 16/390,824

(22) Filed: Apr. 22, 2019

(65) Prior Publication Data

US 2019/0337270 A1  Nov. 7, 2019

(30) Foreign Application Priority Data

May 2, 2018 (JP) .............................. JP2018-088859
Feb. 25, 2019 (JP) .............................. JP2019-031964

(51) Int. Cl.
| | | |
|---|---|---|
| *G02B 27/01* | (2006.01) | |
| *B32B 3/02* | (2006.01) | |
| *B32B 17/10* | (2006.01) | |
| *B32B 7/12* | (2006.01) | |

(52) U.S. Cl.
CPC .......... *B32B 17/10449* (2013.01); *B32B 3/02* (2013.01); *B32B 7/12* (2013.01); *B32B 17/10036* (2013.01); *G02B 27/0101* (2013.01); *B32B 17/10458* (2013.01); *B32B 2307/416* (2013.01); *B32B 2551/00* (2013.01); *B32B 2605/006* (2013.01)

(58) Field of Classification Search
None
See application file for complete search history.

(56) References Cited

U.S. PATENT DOCUMENTS 10,981,358 B2 * 4/2021 Sadakane .......... B32B 17/10559
2019/0030865 A1 * 1/2019 Aoki ....................... B60J 1/001

FOREIGN PATENT DOCUMENTS

JP          2015-24930        2/2015

* cited by examiner

*Primary Examiner* — Derek S. Chapel
(74) *Attorney, Agent, or Firm* — Oblon, McClelland, Maier & Neustadt, L.L.P.

(57) ABSTRACT

A laminated glass includes a first glass plate on a vehicle exterior side, a second glass plate on a vehicle interior side, an intermediate film disposed between the first and second glass plates, a first shielding layer disposed in a peripheral section on an interior surface of the second glass plate, a film disposed between the first and second glass plates, the film extending, in a plan view, in a region overlapping the first shielding layer, and an information-acquisition-area positioned within an opening provided through the first shielding layer and the film, the information-acquisition-area allowing a sensor to obtain information, and wherein a portion of the laminated glass in which the film is disposed and the first shielding layer is not disposed has a visible light reflection of 8% or more, or a diffuse reflection of 9% or more.

17 Claims, 4 Drawing Sheets

LAMINATED GLASS

CROSS-REFERENCE TO RELATED APPLICATION

The present application is based on and claims benefit of priority under 35 U.S.C. § 119 of Japanese Patent Application Nos. 2018-88859 filed on May 2, 2018, and 2019-31964 filed on Feb. 25, 2019, the contents of which are hereby incorporated by reference herein.

BACKGROUND OF THE INVENTION

1. Field of the Invention

The disclosure herein relates to a laminated glass.

2. Description of the Related Art

In recent years, a sensor capable of acquiring visible light, such as a camera, has been provided with some vehicles to recognize an external environment. In such a case, by way of example, an information-acquisition-area is arranged on a part of a windshield of a vehicle so that the sensor can acquire exterior information.

Technologies in which a film having infrared shielding capability, etc. is laminated in a laminated glass for windshield are known. This film is arranged for an occupant of the vehicle. When a visible light transmittance or an infrared transmittance with respect to the film is decreased, it may negatively impact the aforementioned sensor. For this reason, for example, the film positioned within the information-acquisition-area is notched to have a U-shape (see, e.g. Patent Document 1).

CITATION LIST

Patent Literature

[PTL 1] Japanese Laid-Open Patent Publication No. 2015-24930

SUMMARY OF THE INVENTION

Aside from the film described above, in order to project an image of a head-up display (which may be hereafter referred to as a "HUD") on a windshield of a vehicle, a film such as a p-polarized light reflection film, a diffuse reflection film for visible light, a hologram, a high reflectivity film, or a light control film may be laminated in a laminated glass.

With respect to such a film, since it increases reflection or diffuse reflection of visible light, a visible light reflection or a diffuse reflection is higher than that of the aforementioned film that has an infrared shielding power, etc. For this reason, if a film disposed within the information-acquisition-area is notched so as not to affect a desirable performance of a sensor capable of acquiring visible light, the visible light reflects near an end of the notched film, and then the reflected light may enter the sensor (camera, etc.) capable of acquiring visible light. Such a reflected light results in a noise, and thus a performance of the sensor may be negatively impacted.

In light of the above situation, it is an object of the present invention to improve a performance for causing the sensor capable of acquiring visible light to acquire information, in the information-acquisition-area of the laminated glass that is applicable to the HUD.

According to an aspect, a laminated glass is provided, including a first glass plate on a vehicle exterior side, a second glass plate on a vehicle interior side, an intermediate film disposed between the first and second glass plates, a first shielding layer disposed in a peripheral section on an interior surface of the second glass plate, a film disposed between the first and second glass plates, and extending, in a plan view, in a region overlapping the first shielding layer, and an information-acquisition-area positioned within an opening provided through the first shielding layer and the film, the information-acquisition-area allowing a sensor to obtain information, and wherein a portion of the laminated glass in which the film is disposed and the first shielding layer is not disposed has a visible light reflection of 8% or more, or a diffuse reflection of 9% or more, and wherein in the opening, a retreat distance given in a plan view by an offset between an edge of the film and an end of the first shielding layer is 1 mm or more.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1B:
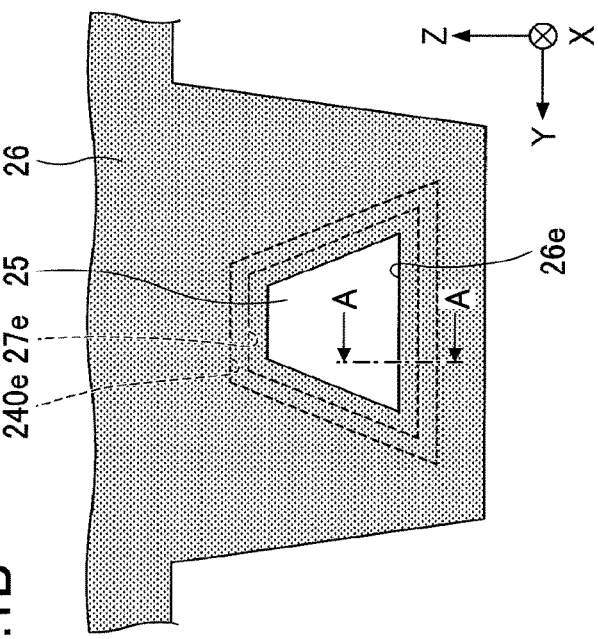
FIGS. 1A to 1C are diagrams illustrating an example of a windshield of a vehicle according to a first embodiment.

Explanation will be hereinafter provided for embodiments of the present invention with reference to drawings. The same reference numerals are used to denote same elements in each drawing; accordingly, for the same elements, explanation may be omitted. It is noted that, in the following description, a windshield of a vehicle is described by way of example, but is limited thereto. Aside from the windshield, for example, a laminated glass used in the embodiments is also applicable to a side glass, a rear glass, or the like. For ease of understanding of the embodiments, some sizes or shapes as shown in the figures are exaggerated.

A plan view refers to viewing a predetermined region of a windshield from a normal direction of a predetermined region. A plane shape refers to a shape given by reviewing a predetermined region of a windshield from a normal direction of a predetermined region. Hereafter, the term "top and bottom" refers to a Z direction in the figures, and the term "left and right" refers to a Y direction in the figures.

First Embodiment

Figure 1A:
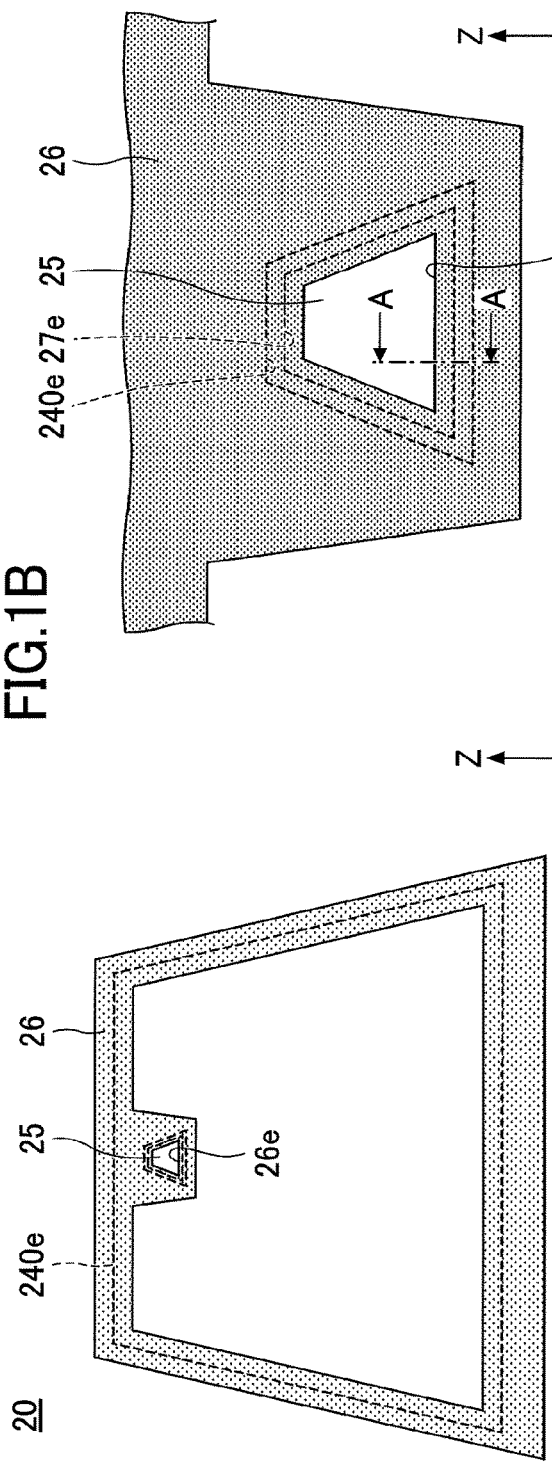
Figure 1C:
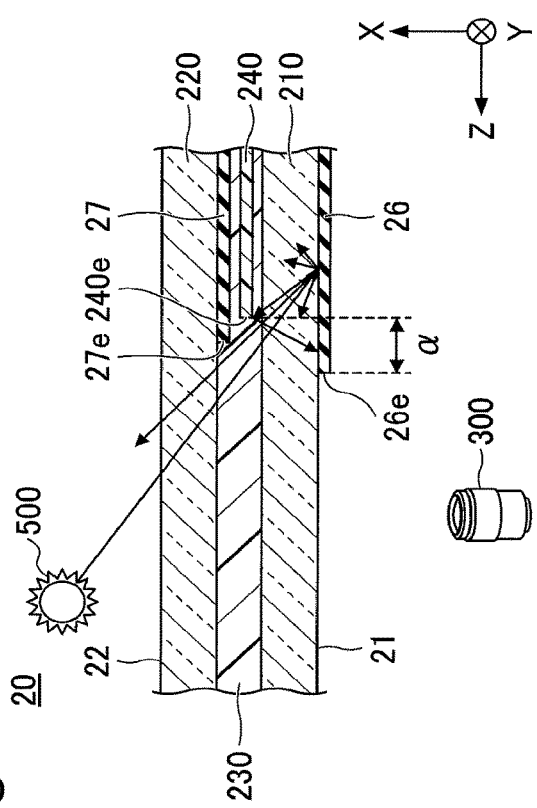

FIGS. 1A to 1C are diagrams illustrating an example windshield of a vehicle. FIG. 1A schematically illustrates an aspect of a windshield 20 viewed from an interior to an exterior. Given that a Z direction is a top direction, the windshield 20 is mounted on the vehicle. FIG. 1B partially illustrates an enlargement near an information-acquisition-area 25 of FIG. 1A. FIG. 1C is a cross-sectional view taken along line A-A in FIG. 1B.

The windshield 20 as illustrated in FIGS. 1A to 1C, is a laminated glass for vehicle. The laminated glass includes a glass plate 210 that is a glass plate on a vehicle interior side, a glass plate 220 that is a glass plate on a vehicle exterior side, an intermediate film 230, and a film 240. In the windshield 20, the glass plates 210 and 220 are secured in such a way that sandwiches the intermediate film 230, in which the film 240 is laminated. The intermediate film 230 formed may include multiple layers.

The film 240 may be secured on an exterior surface of the glass plate 210 with an adhesive layer that has a thin thickness. A material of the adhesive layer is not limited to the disclosure of the embodiments as long as it has a function of securing the film 240. An example of the material of the adhesive layer includes acrylic, acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, or polyvinyl butyral. The material of the adhesive layer is transparent to visible light. It is desirable that the material of the adhesive layer is not adhesive at a normal temperature prior to a process of producing the laminated glass. A thickness of the adhesive layer may be 120 μm or less, 100 μm or less, or 50 μm or less. Alternatively, the thickness of the adhesive layer may be 20 μm or less, 10 μm or less, 5 μm or less, or 2 μm or less.

The windshield 20 may have a display area for a HUD (which may be hereafter referred to as a HUD display area) within a transparent area. The HUD display area is a display area for reflecting a projection image from the interior to display information based on a reflected projection image. Given that a mirror of the HUD installed into the vehicle is rotated, light from the rotated mirror may be irradiated on the windshield 20. In such a way, an area in which the light is irradiated on the windshield 20 is given when viewed forward from a point V1 defined by JIS (Japanese Industrial Standards) R3212, and corresponds to the HUD display area. The "transparent area" used in the description refers to a test area C defined by JIS R3211.

The film 240 is not limited to the disclosure of the embodiments as long as it has a predetermined function, e.g., a function of improving visibility of a display image obtained by the HUD under a predetermined condition, or the like. As the film 240, a film for increasing reflection or diffuse reflection of visible light is used by way of example. A p-polarized light reflection film, a hologram film, a transparent film for diffuse reflection, a light control film, a high reflectivity film for HUD, or the like is an example of the film for increasing reflection or diffuse reflection of visible light. The "light control film" may project a display image with use of the HUD through the light control film. Also, the "light control film" may serve as a transparent screen alone. In this case, a real image such as an image obtained by a projector is projected on the light control film. A thickness of the film 240 ranges from 25 μm or more to 200 μm or less, for example. Preferably, it ranges from 40 μm or more to 170 μm or less, more preferably from 50 μm or more to 150 μm or less. The film 240 is transparent to visible light. A scene outside is visible through the windshield 20 that includes the film 240.

A portion of the windshield 20 in which the film 240 is disposed has a visible light reflection of 8% or more, or as a diffuse reflection of 9% or more. The visible light reflection is given under a measuring and calculating method as defined by JIS R3106. The diffuse reflection is given under a method of measuring spectral reflectivity as defined by JIS R3106. In this case, as with the case of the visible light reflection, the diffuse reflection is given by measuring, at an integrating sphere, light reflected in a regular reflection direction as well as a diffuse reflection direction other than the regular reflection direction. In this description, the visible light reflection and the diffuse reflection with respect to the windshield 20 are measured on an interior side of a transparent portion (region) in which the shielding layer below is not disposed. The transparent portion will be described in detail below. With respect to each of the visible light reflection and the diffuse reflection, if it is not uniformed, a maximum value with respect to the corresponding reflectivity may be employed.

Given that the film 240 laminated in the windshield 20 is a p-polarized light reflection film, a reflectivity of the p-polarized light is preferably 5% or more, in a case where an incident angle of the p-polarized light with respect to an interior surface 21 of the film 210 is a Brewster's angle. The Brewster's angle used in this description is an angle at which light rays from an air area enter the interior surface 21. When the reflectivity of the p-polarized light is 5% or more, a HUD image is visible. In a case where an incident angle of the p-polarized light with respect to the interior surface 21 of the film 210 is a Brewster's angle, the reflection angle of the p-polarized light is preferably 7% or more, more preferably 9% or more. It is noted that the reflection angle of the p-polarized light is calculated under the method of measuring a spectral reflectivity defined by JIS R3106. In this case, the spectral reflectivity is measured by referencing the p-polarized light with a visible wavelength, with respect to a predetermined incident angle. In addition, under the method of calculating a visible light reflection defined by JIS R3106, the incident angle of the p-polarized light is calculated based on the measured spectral reflectivity.

For the windshield 20, the interior surface 21 of the glass plate 210 on the interior side, and an exterior surface 22 of the glass plate 220 on the exterior side may be flat or curved; however, these surfaces 21 and 22 are preferably curved surfaces since the effect disclosed in the embodiment is further obtained. When an area corresponding to the information-acquisition-area 25 of the windshield 20 has a curved surface, external light is condensed whereby it is possible to improve the effects of, e.g., causing a sensor capable of acquiring visible light to acquire information. It is noted that the interior surface 21 and an exterior surface (opposite to the interior surface 21) of the glass plate 210 are smooth. Also, the exterior surface 22 and an interior surface (opposite to the exterior surface 22) of the glass plate 220 are smooth.

In the HUD display area, with respect to the Z direction (vertical direction), a curvature radius of the windshield 20 preferably ranges from 4000 mm or more to 20000 mm or less, more preferably from 6000 mm or more to 20000 mm or less. Also, with respect to the Y direction (horizontal direction), a curvature radius of the windshield 20 preferably ranges from 1000 mm or more to 10000 mm or less. In a case where, with respect to each of the Y and Z directions, the curvature radius of the windshield 20 is given the value as specified above, distortion with respect to the HUD image projected on the film 240 can be decreased. However, if the above curvature radius is decreased, it may result in wrinkle of the film 240.

As the glass plates 210 and 220, inorganic glass such as soda-lime glass or alumino-silicate glass, organic glass, or the like can be used. When the glass plates 210 and 220 are made of inorganic glass, they can be manufactured by a float process, for example.

For the glass plate 220 positioned on the exterior side of the windshield 20, the thinnest portion preferably has a thickness ranging from 1.8 mm or more to 3.0 mm or less. When the thickness of the glass plate 220 is 1.8 mm or more, strength of the glass plate 220 may be sufficient in terms of properties such as protecting damage due to a flying stone. When the thickness of the glass plate 220 is 3.0 mm or less, it is desirable in terms of fuel consumption of the vehicle, since the mass of a given laminated glass is not increased excessively. The thinnest portion of the glass plate 220 more preferably ranges from 1.8 mm or more to 2.8 mm or less, and still more preferably from 1.8 mm or more to 2.6 mm or less. Alternatively, the thinnest portion of the glass plate 220 more preferably has a thickness ranging from 1.8 mm or more to 2.2 mm or less, and still more preferably from 1.8 mm or more to 2.0 mm or less.

For the glass plate 210 positioned on the interior side of the windshield 20, a thickness preferably ranges from 0.3 mm or more to 2.3 mm or less. When the thickness of the glass plate 210 is 0.3 mm or more, it enables excellent handling of the vehicle. When the thickness of the glass plate 210 is 2.3 mm or less, the mass of the windshield 20 is not increased excessively.

In a case where the thickness of the glass plate 210 ranges from 0.3 mm or more to 2.3 mm or less, it can preserve quality of glass (e.g., residual stress). By setting the thickness of the glass plate 210 to 0.3 mm or more to 2.3 mm or less, it particularly can provide an advantage of preserving quality of glass (e.g., residual stress) with respect to deep curved glass. The thickness of the glass plate 210 more preferably ranges from 0.5 mm or more to 2.1 mm or less, and still more from 0.7 mm or more to 1.9 mm or less.

The thicknesses of the glass plates 210 and 220 are not required to be constant. For example, they may vary on a per-position basis as needed. For example, in a case where the windshield 20 is mounted on the vehicle, at least one of the glass plates 210 and 220 may have, in a cross sectional view (in the Z direction), a wedge-shaped region in which a thickness of its top part is thicker than that of its bottom part.

In a case where the windshield 20 has a curved shape, after forming of the glass plates 210 and 220 by a float process, etc., these plates 210 and 220 are formed by bending prior to bonding them via the intermediate film 230. In bending the glass plates 210 and 220, glass is softened by heat treating. In such a bending process, a temperature of heated glass roughly ranges from 550° C. to 700° C.

As the intermediate film 230 that bonds the glass plates 210 and 220, a thermoplastic resin is often used. The thermoplastic resin is commonly used in this type of application, and includes, for example, plasticized polyvinyl acetal resin, plasticized polyvinyl chloride resin, saturated polyester resin, plasticized saturated polyester resin, polyurethane resin, plasticized polyurethane resin, ethylene oxide-vinyl copolymer resin, ethylene ethyl acrylate copolymer resin, or the like. A resin composition that includes the modified block copolymer hydrides disclosed in Japanese Patent No. 6065221 can be also preferably used as each of the glass plates 210 and 220.

Among the resin materials described above, the plasticized polyvinyl acetal resin is preferably used since it has an excellent balance in terms of properties such as transparency, weather resistance, strength, adhesive force, penetration resistance, impact-energy-absorption, humidity resistance, thermal barrier, and sound insulation. Any thermoplastic resin described above may be used alone, or alternatively, two or more types of the thermoplastic resin used may be combined. The "plasticized" with respect to the plasticized polyvinyl acetal resin refers to being plasticized by addition of plasticizer. Similarly, other plasticized resin is also applicable.

As the polyvinyl acetal resin described above, for example, polyvinyl formal resin obtained by reacting polyvinyl alcohol (which may be hereafter referred to as "PVA") and formaldehyde, polyvinyl acetal resin in a narrow sense, obtained by reacting PVA and acetaldehyde, polyvinyl butyral resin (which may be hereafter referred to as "PVB") obtained by reacting PVA and n-butyraldehyde, or the like is used. PVA is preferably used since it has an excellent balance in terms of properties such as transparency, wheather resistance, strength, adhesive force, penetration resistance, impact-energy-absorption, humidity resistance, thermal barrier, and sound insulation. Any polyvinyl acetal resin described above may be used alone, or alternatively, two or more types of the polyvinyl acetal resin used may be combined. A material of the intermediate film 230 is not limited to thermoplastic resin.

For the intermediate film 230, the thinnest portion preferably has a thickness of 0.5 mm or more. When the thickness of the intermediate film 230 is 0.5 mm or more, penetration resistance required for a windshield is sufficient. Also, the thickest portion of the intermediate film 230 preferably has a thickness of 3 mm or less. When a maximum thickness of the intermediate film 230 is 3 mm or less, the mass of a given laminated glass is not increased excessively. A maximum thickness of the intermediate film 230 is preferably 2.8 mm or less, more preferably 2.6 mm or less.

It is noted that the intermediate film 230 may include three or more layers. For example, in a case where an intermediate film consists of three layers, when hardness of a middle layer among the three layers is lower than that of each of top and bottom layers, by adjusting plasticizer, or the like, sound insulation properties of a laminated glass including such an intermediate film can be improved. In such an aspect, the top and bottom layers may have the same hardness, or have different hardness.

In producing the intermediate film 230, for example, resin material(s) used for a given intermediate film are selected among the resin materials described above, as appropriate. In addition, the selected resin material(s) are extruded and molded at a hot-melt state by using an extruder. An extruded condition, such as an extruding speed of the extruder, is set such that a surface of the given intermediate film can be uniform. Next, the resin film molded by the extruding is e.g., extended as needed so as to fit the geometry of windshield 20. In such a way, top and bottom sides of the intermediate film have curvatures, and thus the intermediate film 230 is completed.

In producing a laminated glass, firstly, by sandwiching the intermediate film 230 in which the film 240 is laminated between the glass plates 210 and 220, a laminate that includes the film 230 and the glass plates 210 and 220 is formed. Next, for example, the laminate is placed within a rubber bag, and then bonded in a vacuum at a pressure of −65 to −1000 kPa and temperatures of approximately 70 to 110° C.

In addition, for example, in a case where press-bonding treatment for heating and pressing the laminate is carried out under conditions of e.g., 100 to 150° C. and a pressure of 0.6 to 1.3 MPa, the resulting laminated glass can have excellent durability. In consideration to simplifying producing processes as well as properties of materials needed for the laminated glass, the heating and pressing process described above may not be performed on a case by case basis.

In another embodiment, in addition to the intermediate film 230 and the film 240, a film or a device, each of which has infrared reflection, luminescence, electricity generation, dimming, visible light reflection, diffusion, adornment, or/and absorbing, or/and the like may be further disposed between the glass plate 210 and the glass plate 220, as long as the effects disclosed in the embodiment is obtained. Also, a film that has a function of anti-fog, water-repellent, thermal insulating, or/and low reflection, or the like is disposed on the surface(s) of the windshield 20. Also, a film that have a function of thermal insulating, heating, or/and the like may be disposed on an exterior surface of the glass plate 210, or/and an interior surface of the glass plate 220.

It is noted that an FOV (Field Of View) of the HUD is 4 degrees by 1 degree or broader, for example. The FOV of the HUD may be 5 degrees by 1.5 degrees or broader, 6 degrees by 2 degrees or broader, or 7 degrees by 3 degrees or broader.

Referring back to FIGS. 1A to 1C, shielding layers 26 and 27 are disposed in a peripheral section of the windshield 20. The shielding layers 26 and 27 are opaque (e.g., black)-colored-ceramic-layers, which are formed by, e.g., applying a printing ink with a predetermined color to a glass surface as well as baking the ink. However, the shielding layers 26 and 27 are not limited to the example described above. In a case where opaque shielding layers 26 and 27 are disposed in the peripheral section of the windshield 20, deterioration caused from ultraviolet radiation can be decreased, since resin such as urethane for attaching the peripheral section of the windshield 20 to the vehicle, and a bonding member for bonding a member (e.g. a bracket) for holding the camera 300 on the interior surface 21 may block the ultraviolet radiation.

It is noted that, in a plan view in at least a part of regions of interior surfaces of the shielding layers 26 and 27, the film 240 is disposed between the glass plates 210 and 220. Additionally, the film 240 extends, in a plan view, in a region overlapping the shielding layers 26 and 27 (e.g., FIG. 1A). As illustrated in FIG. 1A, in a plan view, the film 240 may be completely disposed inside a region surrounding the glass plates 210 and 220 of the windshield 20.

In FIGS. 1A to 1C, the shielding layer 26 is disposed on the interior surface of the glass plate 210 (interior surface 21 of the windshield 20), and further, the shielding layer 27 is disposed on the interior surface of the glass plate 220. However, such an aspect is not limited to the example illustrated in these figures. The shielding layer 27 may not be disposed in a case where the shielding layer 26 is disposed on the interior surface of the glass plate 210 (interior surface 21 of the windshield 20).

It is noted that when the shielding layer 27 is arranged, an end 240e of the film 240 may preferably overlap the shielding layer 27 in a plan view. In such an aspect, the end 240e of the film 240 is not visible from the exterior, thereby improving an appearance of the vehicle.

The information-acquisition-area 25 is arranged on a top peripheral section of the windshield 20. The information-acquisition-area 25 is positioned within an opening that is provided through the shielding layers 26 and 27 and the film 240, in a region that in a plan view, overlaps the shielding layers 26 and 27 and the film 240. In other words, the information-acquisition-area 25 includes the glass plates 210 and 220 and the intermediate film 230, but does not include the film 240 and the shielding layers 26 and 27.

The information-acquisition-area 25 functions as an area through which light passes in a case where a camera 300 capable of acquiring visible light is arranged in the top peripheral section of the windshield 20. This arrangement of the camera 300 is merely an example. Instead of the camera 300, a sensor capable of acquiring visible light may be arranged. In this case, as with the case of the camera 300, the information-acquisition-area 25 allows visible light to be acquired. A illumination sensor is an example of the sensor capable of acquiring visible light.

In an outer peripheral section of the information-acquisition-area 25, the end 240e of the film 240, an end 26e of the shielding layer 26, and an end 27e of the shielding layers 27 are positioned. When external light enters the windshield 20, an incident light of the external light with respect to the windshield 20 is diffused near the end 26e of the shielding layer 26 on an interior side of the glass plate 210. Further, some of the diffused light may be reflected near the end 240e on an interior side of the film 240, to the glass plate 210. It is noted that the external light refers to light (sunlight) from the sun 500, for example.

Depending upon a positional relationship of the ends 240e, 26e and 27e, the light reflected near the end 240e of the film 240 to the glass plate 210 may enter the camera 300.

Figure 2:
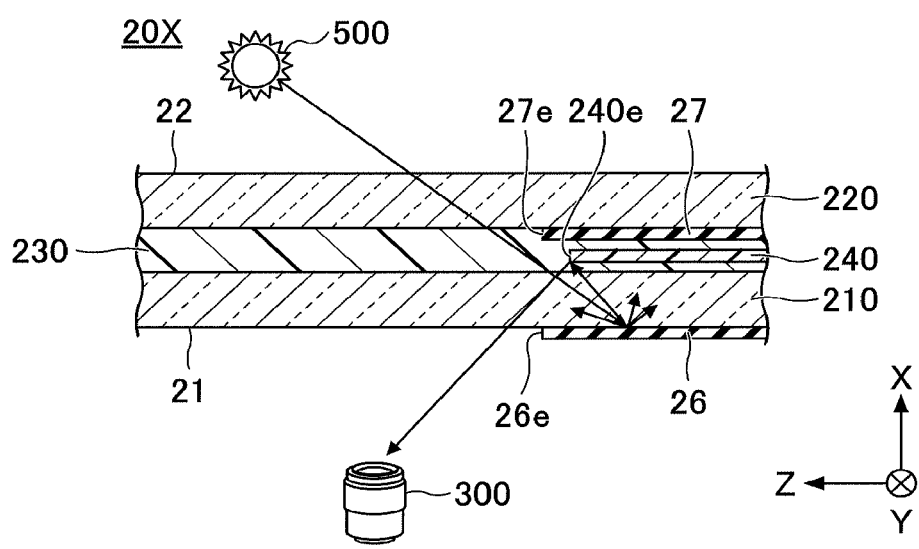
FIG. 2 is a diagram illustrating an example of a windshield for Comparative Example.

As an example, FIG. 2 illustrates a windshield 20X as a Comparative Example. In the windshield 20X, glass plate ends 26e and 27e are approximately arranged at the same positions in a plan view (in a Z direction). A film end 240e retreats (is set back), in a plan view, with respect to shielding layer ends 26e and 27e, so as to be close to an outer peripheral side of the information-acquisition-area 25 (see FIGS. 1A to 1C). That is, the film end 240e is set back from the shielding layer ends 26e and 27e in such a direction that is away from the information-acquisition-area 25.

In FIG. 2, a retreat distance given from an offset of the film end 240e with respect to the shielding layer ends 26e and 27e is relatively small. For this reason, light is diffused near the end 26e of the shielding layer 26, and then the diffused light is reflected near the end 240e of the film 240 to the glass plate 210. As a result, the reflected light enters the camera 300. Such reflected light results in noise, and thus an information-acquisition-performance (external-environment-perception-performance) of the camera 300 may be decreased.

In light of the point described above, as illustrated in FIG. 1C, the windshield 20 defines a retreat distance α of the film end 240e with respect to the smaller of the opening of the shielding layer 26 or the opening of the shielding layer 27. In the example of FIG. 1C, since the opening of the shielding layer 26 is smaller than that of shielding layer 27, the retreat distance α is defined from an offset of the end 240e of the film 240 with respect to the shielding layer end 26e. If the opening of the shielding layer 27 is smaller than that of shielding layer 26, the retreat distance α is defined from an offset of the end 240e of the film 240 with respect to the shielding layer end 27e. That is, an edge of a shielding layer used as a reference in defining the retreat distance α is an edge of a shielding layer positioned closer to a center of the opening, from among the end 26e of the shielding layer 26 that is arranged in a peripheral section on the interior surface of the glass plate 210, and the end 27e of the shielding layer 27 that is arranged in a peripheral section on the interior surface of the glass plate 220. The opening, that is, a region adjacent to the opening has a portion in which an end of one of the shielding layers by the retreat distance α.

The retreat distance α is defined, such that after external light entering the windshield 20 is diffused near the end 26e of the shielding layer 26 toward the film 240, the light reflected near the end 240e of the film 240 does not enter the camera 300.

After careful consideration, it has been found by the inventors that in the case of the retreat distance α of 1 mm or more, the light reflected near the end 240e of the film 240 to the glass plate 210 is shielded by the shielding layer 26, and thus such reflected light can be prevented from entering the camera 300. That is, by setting the retreat distance α to 1 mm or more, noise light can be prevented from entering the camera 300, thereby improving the information-acquisition-performance of the camera 300.

The retreat distance α is preferably 2 mm or more, more preferably 5 mm or more, and still more preferably 10 mm or more. More preferably, the retreat distance α is 15 mm or more, still more preferably 25 mm or more. Increasing the retreat distance α can efficiently prevent noise light from entering the camera 300. The retreat distance α is preferably 200 mm or less, more preferably 180 mm or less, and still more preferably 150 mm or less.

The retreat distance α is not required to be 1 mm or more, with respect to an entire outer periphery of the information-acquisition-area 25. For example, in a case where the windshield 20 is mounted on the vehicle, the following retreat distance(s) may be set to 1 mm or more, as needed: a retreat distance $\alpha_{top}$ with respect to a top side of an outer peripheral section of the information-acquisition-area 25, a retreat distance $\alpha_{bottom}$, with respect to a bottom side of an outer peripheral section of the information-acquisition-area 25, or a retreat distance $\alpha_{side}$ with respect to left and right sides of an outer peripheral section of the information-acquisition-area 25. For example, in terms of sunlight, in a case where sunlight does not easily enter the top side of the outer peripheral section of the information-acquisition-area 25, but it easily enters the bottom and left and right sides of an outer peripheral section of the information-acquisition-area 25, the retreat distance $\alpha_{top}$ is not defined, and further, the retreat distances $\alpha_{bottom}$ and $\alpha_{side}$ are defined to be 1 mm or more. Certainly, the retreat distances $\alpha_{bottom}$ and $\alpha_{side}$ may be 2 mm or more, 5 mm or more, 10 mm or more, 15 mm or more, 20 mm or more, or 25 mm or more.

As described above, the portion of the windshield 20 in which the film 240 is arranged has a visible light reflection of 8% or more, or a diffuse reflection of 9% or more. However, the visible light reflection may be increased to, e.g., 9%, 10%, 11%, 11.5%, or 12%. Also, the diffuse reflection may be increased to, e.g., 10%, 11%, 11.5%, or 12%.

With respect to the portion of the windshield 20 in which the film 240 is laminated, when the visible light reflection or the diffuse reflection is increased, strength (strength of noise light) with respect to light reflected near the end 240e of the film 240 to the glass plate 210 is increased accordingly. In such a case, if noise light with high strength enters the camera 300, an information-acquisition-performance of the camera 300 is negatively impacted greatly. In light of this situation, in the embodiments, the retreat distance α is set to be 1 mm or more, and thus this provides a high advantage of preventing noise light from entering the camera 300. In a case where a visible light reflection is 10% or more, or where a diffuse reflection is 11% or more, the retreat distance α is preferably 5 mm or more.

Second Embodiment

A second embodiment illustrates an example case of preventing noise light from entering the camera 300 in a different way from the first embodiment. For the same elements of the second embodiment as those of the embodiment described above, explanation may be omitted.

Figure 3A:
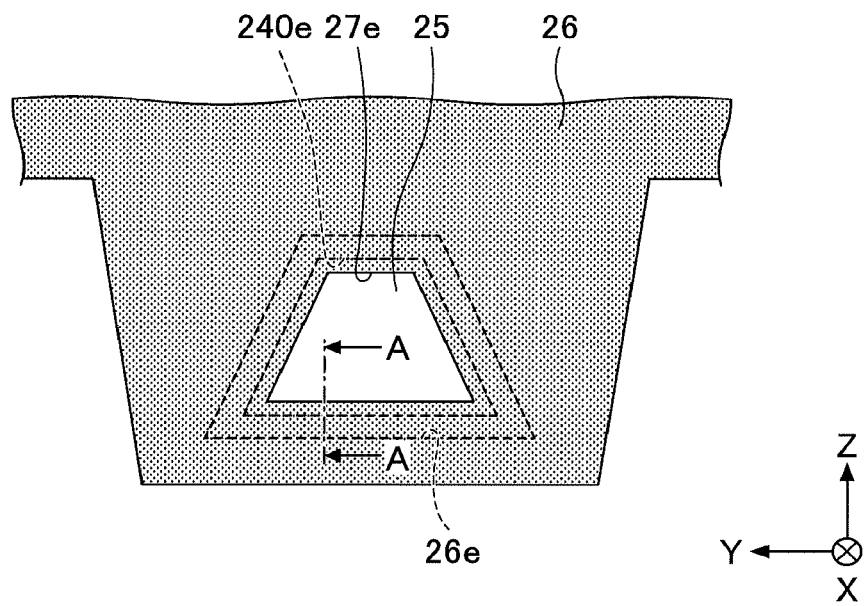
FIGS. 3A and 3B are diagrams illustrating an example of a windshield of a vehicle according to a second embodiment.
Figure 3B:
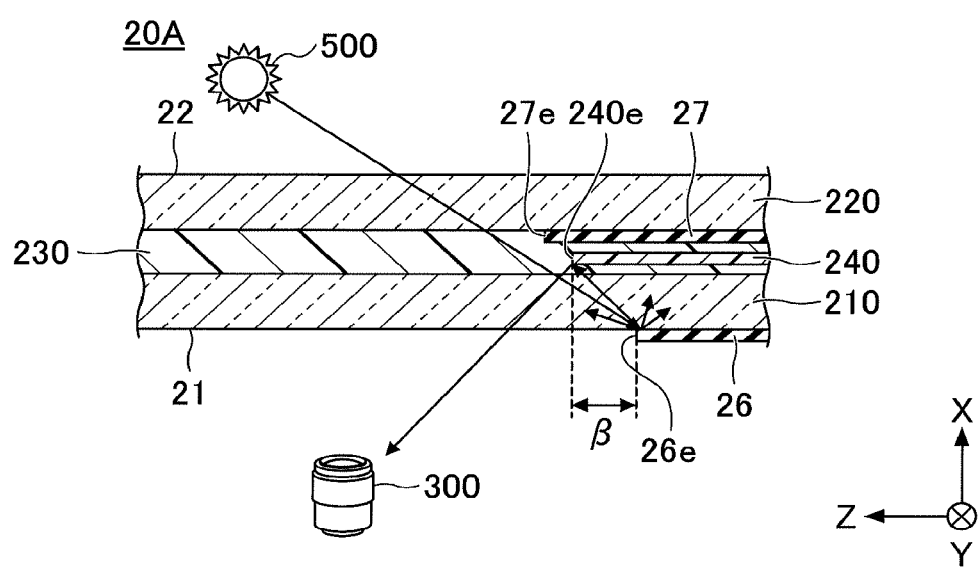

FIGS. 3A and 3B are diagrams illustrating an example of a windshield 20A of a vehicle according to the second embodiment. FIG. 3A partially illustrates an enlargement of an information-acquisition-area 25. FIG. 3B is a schematic cross-sectional view taken along line A-A in FIG. 3A. It is noted that since a whole structure of the windshield 20A is the same as that of the windshield 20 in FIG. 1A, it is not shown in these figures.

For the windshield 20A illustrated in FIGS. 3A and 3B, a positional relationship of a film end 240e and shielding layer ends 26e and 27e is different from that of FIGS. 1A to 1C. In other words, the shielding layer end 26e, the film end 240e and the shielding layer end 27e are sequentially arranged, in a plan view, from a central portion of an opening in which an information-acquisition-area 25 is disposed, to an outer portion of the opening.

In the windshield 20A, as illustrated in FIG. 3B, a retreat distance β is defined by an offset of the end 26e of the shielding layer 26 with respect to the end 240e of the film 240. The opening, that is, a region adjacent to the opening has a portion in which the end 26e of the shielding layer 26 retreats with respect to the end 240e of the film 240 by the retreat distance β. The retreat distance β is defined, such that after external light entering the windshield 20A is diffused near the end 26e of the shielding layer 26 toward the film 240, the light reflected near the end 240e of the film 240 does not enter the camera 300.

After careful consideration, it has been found by the inventors that in the case of the retreat distance β of 1 mm or more, light reflected near the end 240e of the film 240 to the glass plate 210 can be emitted out of the camera 300, and thereby preventing light from entering the camera 300. That is, by setting the retreat distance β to 1 mm or more, noise light can be prevented from entering the camera 300, thereby improving the information-acquisition-performance of the camera 300.

The retreat distance β is preferably 2 mm or more, more preferably 5 mm or more, and still more preferably 10 mm or more. More preferably, the retreat distance β is 15 mm or more, still more preferably 20 mm or more. Increasing the retreat distance β can prevent noise light from entering the camera 300.

The retreat distance β is not required to be 1 mm or more, with respect to an entire outer periphery of the information-acquisition-area 25. For example, in a case where the windshield 20A is mounted on the vehicle, the following retreat distance(s) may be set to 1 mm or more as needed: a retreat distance $\beta_{top}$ with respect to a top side of an outer peripheral section of the information-acquisition-area 25, a retreat distance $\beta_{bottom}$ with respect to a bottom side of an outer peripheral section of the information-acquisition-area 25, or a retreat distances $\beta_{side}$ with respect to left and right sides of an outer peripheral section of the information-acquisition-area 25. For example, in terms of sunlight, in a case where sunlight does not easily enter a top side of the outer peripheral section of the information-acquisition-area 25, but it easily enters the bottom and left and right sides of an outer peripheral section of the information-acquisition-area 25, the retreat distance $\beta_{top}$ is not defined, and further, the retreat distances $\beta_{bottom}$ and $\beta_{side}$ are defined to be 1 mm or more. Certainly, the retreat distances $\beta_{bottom}$ and $\alpha_{side}$ may be 2 mm or more, 5 mm or more, 10 mm or more, 15 mm or more, 20 mm or more, or 25 mm or more.

The portion of the windshield 20A in which the film 240 is arranged has a visible light reflection of 8% or more, or a diffuse reflection of 9% or more. However, the visible light reflection may be increased to, e.g., 9%, 10%, 11%, 11.5%, or 12%. Also, the diffuse reflection may be increased to, e.g., 10%, 11%, 11.5%, or 12%.

With respect to the portion of the windshield 20 in which the film 240 is laminated, when the visible light reflection or the diffuse reflection is increased, strength (strength of noise light) with respect to light reflected near the end 240e of the film 240 to the glass plate 210 is increased accordingly. In such a case, if noise light with high strength enters the camera 300, an information-acquisition-performance of the camera 300 is negatively impacted greatly. In light of this situation, in the embodiments, the retreat distance β is set to 1 mm or more, and thus it provides a high advantage of preventing noise light from entering the camera 300. In a case where a visible light reflection is 10% or more, or where a diffuse reflection is 11% or more, the retreat distance β is preferably 5 mm or more.

Modifications of First and Second Embodiments

Explanation will be provided for modifications of the first and second embodiments, in which a shape of the information-acquisition-area is different from that of the information-acquisition-area 25 according to the first and second embodiments. For the same elements of the modifications as those of the first and second embodiments, explanations may be omitted.

Figure 4A:
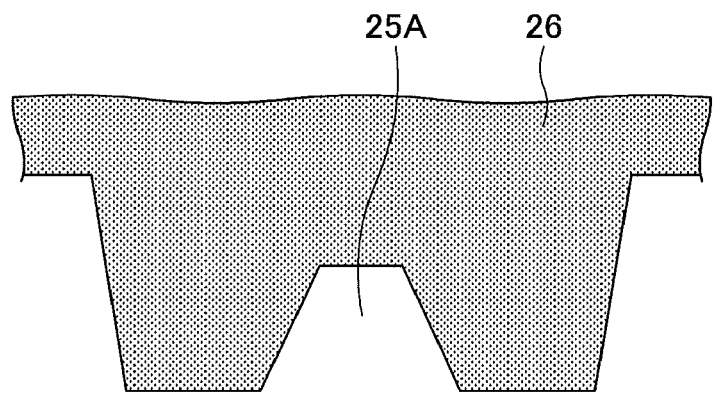
FIGS. 4A and 4B are diagrams partially illustrating an enlargement near an information-acquisition-area according to modifications of the first and second embodiments.
Figure 4B:
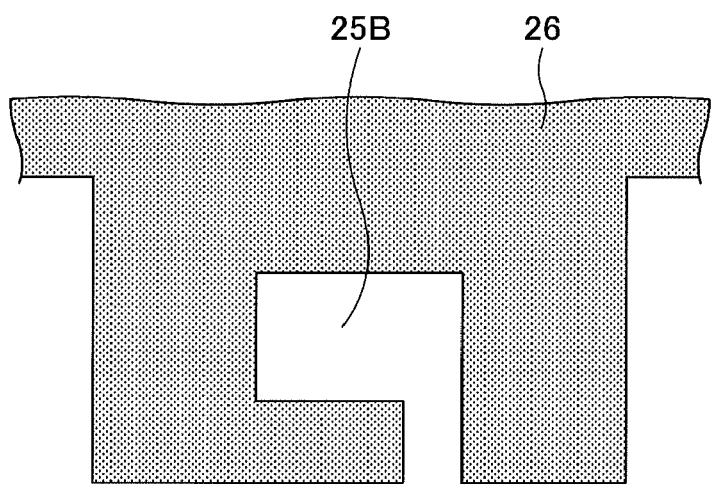

FIGS. 4A and 4B are partially enlarged views of a portion near an information-acquisition-area according to the modifications of the first and second embodiment. For the first and second embodiments, explanation has been provided for the case where, in a plan view (FIGS. 1A, 1B and 3A), an entire outer periphery of the information-acquisition-area 25 is surrounded by the shielding layers 26 and 27. However, a configuration is not limited to the examples described above. For example, as illustrated in an information-acquisition-area 25A in FIG. 4A and an information-acquisition-area 25B in FIG. 4B, the information-acquisition-area may be configured, such that a part of an outer periphery of the information-acquisition-area is surrounded by shielding layers 26 and 27 and further, the remaining part of the outer periphery of the information-acquisition-area is not surrounded by the shielding layers 26 and 27. For example, the shielding layers 26 and 27 that surround the whole outer circumference of the information-acquisition-area 25 may have a slit-shaped opening. It is noted that given that noise light enters the camera 300, an information acquisition performance of the camera 300 may be negatively affected. Such a problem may occur in a portion in which the outer periphery of the information-acquisition-area is surrounded by the shielding layer(s).

In the first and second embodiments, explanation has been provided for the case where, in a plan view, a planer shape of the information-acquisition-area 25 is an isosceles trapezoid (FIGS. 1A, 1B and 3A). However, it is not limited to the examples described above. As an example, as illustrated in the information-acquisition-area 25B in FIG. 4B, the information-acquisition-area may have a rectangular shape. Alternatively, the information-acquisition-area may have other planar shapes.

Examples 1 to 7 and Comparison 1

Next, explanation will be provided below for Examples 1 to 7 and Comparison 1. As each of the glass plates 210 and 220, the following glass (which is called VFL from AGC Corporation) was prepared. The glass had a length of 300 mm, a width of 300 mm, and a thickness of 2 am. The glass was a soda-lime glass whose shape was a quadrangle. Also, as the film 240, a highly reflective film with a thickness of 50 Jim was used, and it was laminated between first and second intermediate films (which were PVBs from Eastman Chemical Company). The first intermediate film had a thickness of 0.76 mm, and the intermediate film had a thickness of 0.38 mm. The film used as the film 240 was made of PET, and was coated with titanium oxide. The intermediate films in which the film 240 was laminated were sandwiched by the glass plates 210 and 220. Next, a sandwiched laminate, including the glass plates 210 and 220 and the film 240, was temporarily bonded by pressure in a vacuum, and then was bonded by thermo-compression via autoclave. As a result, laminated glasses for examples 1 to 7 and comparison 1 were produced. Each produced laminated glass had a visible light reflection of 11%.

It is noted that the shielding layers 26 and 27 formed were made of black ceramic layers. The shielding layer 26 was formed on an interior surface of the glass plate 210, and the shielding layer 27 was formed on an interior surface of the glass plate 220. In addition, the information-acquisition-area 25 was arranged within an opening provided through the shielding layers 26 and 27 and the film 240. Finally, as with the case of FIG. 1C, in a plan view, the end 26e of the shielding layer 26 was positioned inwardly more than the end 27e of the shielding layer 27, in the opening within which the information-acquisition-area 25 was positioned.

A shape of the information-acquisition-area 25, which was defined based on positions of the end 26e of the shielding layer 26, was an isosceles trapezoid. The information-acquisition-area 25 had a top base of 20 mm, a bottom base of 80 mm and a height of 80 mm, in a plan view.

For Comparison 1, the retreat distance CY is 0 mm, and for Examples 1 to 7, the retreat distances CX were 1 mm, 2 mm, 5 mm, 10 mm, 15 mm, 20 mm, 25 mm, respectively. It is noted that, for each Example and Comparison, as an entire periphery of the information-acquisition-area 25, the same value was used.

By taking an installation angle of a general windshield into account, the laminated glass for each Example and Comparison was mounted on a given vehicle so as to be inclined with respect to a horizontal plane at 23.5 degrees. A distance between the glass plate 210 and the camera 300 was 100 mm in an optical axis of the camera 300. When the installation angle of the laminated glass with respect to the horizontal plane ranged from 15 degrees or more to 35 degrees or less, sunlight easily entered the information-acquisition-area such that the improving effects disclosed in the embodiments became further advantageous.

In Examples 1 to 7 and Comparison 1, by taking a position of the sun during the daytime into account, sunlight was emitted on a windshield of a vehicle at an incident angle of 10 degrees with respect to a normal vector of the information-acquisition-area 25, in front of the vehicle. In such an aspect, a given object was at a position of 5 m ahead of the camera 300, and was recognized by the camera 300. Table 1 showed results as to whether the object could be recognized. In Table 1, "Excellent" indicated a case in which the object was clearly recognized, "Good" indicated a case in which the object was recognized, and "Poor" indicated a case in which the object was not recognized.

TABLE 1

| | α [mm] | Determination |
|---|---|---|
| Comparison 1 | 0 | Poor |
| Example 1 | 1 | Good |
| Example 2 | 2 | Good |
| Example 3 | 5 | Excellent |
| Example 4 | 10 | Excellent |
| Example 5 | 15 | Excellent |
| Example 6 | 20 | Excellent |
| Example 7 | 25 | Excellent |

As shown in Table 1, in Comparison 1 in which the retreat distance α of the end 240e of the film 240 with respect to the end 26e of the shielding layer 26 was 0 mm, the object couldnot be recognized by the camera 300. In contrast, in each of Examples 1 to 7 in which the retreat distances α were 1 mm or more, the object could be recognized by the camera 300. That is, by setting the retreat distance α to 1 mm or more, noise light could be prevented from entering the camera 300 whereby it had been found that the information-acquisition-performance of the camera 300 was improved.

Examples 8 to 14 and Comparison 2

As each of the glass plates 210 and 220, the following glass (which was called VFL from AGC Corporation) was prepared. The glass had a length of 300 mm, a width of 300 mm, and a thickness of 2 mm. The glass was a soda-lime glass whose shape was a quadrangle. Also, as the film 240, a highly reflective film with a thickness of 50 LAm was used, and it was laminated between first and second intermediate films (which were PVBs from Eastman Chemical Company). The first intermediate film had a thickness of 0.76 mm, and the intermediate film had a thickness of 0.38 mm. The film used as the film 240 was made of PET, and was coated with titanium oxide. The intermediate films in which the film 240 was laminated were sandwiched by the glass plates 210 and 220. Next, a sandwiched laminate, including the glass plates 210 and 220 and the film 240, was temporarily bonded by pressure in a vacuum, and then was bonded by thermo-compression via autoclave. As a result, laminated glasses for examples 8 to 14 and comparison 2 were produced. Each produced laminated glass had a visible light reflection of 11%.

It is noted that the shielding layers 26 and 27 formed were made of black ceramic layers. The shielding layer 26 was formed on an interior surface of the glass plate 210, and the shielding layer 27 was formed on an interior surface of the glass plate 220. In addition, the information-acquisition-area 25 was arranged within an opening provided through the shielding layers 26 and 27 and the film 240. Finally, as with the case of FIG. 3B, in a plan view, the end 27e of the shielding layer 27 was positioned inwardly more than the end 26e of the shielding layer 26, in the opening within which the information-acquisition-area 25 was positioned.

A shape of the information-acquisition-area 25, which was defined based on positions of the end 27e of the shielding layer 27, was an isosceles trapezoid. The information-acquisition-area 25 had a top base of 20 mm, a bottom base of 90 mm and a height of 80 mm, in a plan view.

For Comparison 2, the retreat distance β is 0 mm, and for Examples 8 to 14, the retreat distances β were 1 mm, 2 mm, 5 mm, 10 mm, 15 mm, 20 mm, 25 mm, respectively. It is noted that, for each Example and Comparison, as an entire periphery of the information-acquisition-area 25, the same value was used.

By taking an installation angle of a general windshield into account, the laminated glass for each Example and Comparison was mounted on a given vehicle so as to be inclined with respect to a horizontal plane at 23.5 degrees. A distance between the glass plate 210 and the camera 300 was 100 mm in an optical axis of the camera 300.

In Examples 8 to 14 and Comparison 2, by taking a position of the sun during the daytime into account, sunlight was emitted on a windshield of a vehicle at an incident angle of 10 degrees with respect to a normal vector of the information-acquisition-area 25, in front of the vehicle. In such an aspect, a given object was at a position of 5 m ahead of the camera 300, and was recognized by the camera 300. Table 1 showed results as to whether the object could be recognized. In Table 1, "Excellent" indicated a case in which the object was clearly recognized, "Good" indicated a case in which the object was recognized, and "Poor" indicated a case in which the object was not recognized.

TABLE 2

| | β [mm] | Determination |
|---|---|---|
| Comparison 2 | 0 | Poor |
| Example 8 | 1 | Good |
| Example 9 | 2 | Good |
| Example 10 | 5 | Excellent |
| Example 11 | 10 | Excellent |
| Example 12 | 15 | Excellent |
| Example 13 | 20 | Excellent |
| Example 14 | 25 | Excellent |

As shown in Table 2, in Comparison 2 in which the retreat distance β of the end 240e of the film 240 with respect to the end 26e of the shielding layer 26 was 0 mm, the object couldnot be recognized by the camera 300. In contrast, in each of Examples 8 to 14 in which the retreat distances β were 1 mm or more, the object could be recognized by the camera 300. That is, by setting the retreat distance β to 1 mm or more, noise light could be prevented from entering the camera 300 whereby it had been found that the information-acquisition-performance of the camera 300 was improved.

Explanation has been provided above for the preferable embodiments. However, they are merely example aspects, and are not limited thereto. Various modifications and alternatives to the embodiments can be made within the scope of the claims.

What is claimed is:
1. A laminated glass comprising:
    a first glass plate on a vehicle exterior side;
    a second glass plate on a vehicle interior side;
    an intermediate film disposed between the first and second glass plates;
    a first shielding layer disposed in a peripheral section on an interior surface of the second glass plate;
    a film disposed between the first and second glass plates, and extending, in a plan view, in a region overlapping the first shielding layer; and
    an information-acquisition-region positioned within an opening provided through the first shielding layer and the film, the information-acquisition-region allowing a sensor to obtain information, and
    wherein a portion of the laminated glass in which the film is disposed and the first shielding layer is not disposed has a visible light reflectivity of 8% or more, or a diffuse reflectivity of 9% or more, and
    wherein in the opening, an edge of the film retreats, in a plan view, with respect to an edge of the first shielding layer, and a retreat distance $\alpha$ of the edge of the film with respect to the end of the first shielding layer is 1 mm or more.

2. The laminated glass according to claim 1, further comprising a second shielding layer disposed in a peripheral section on an interior surface of the first glass plate, and
wherein an edge of a shielding layer used as a reference in defining the retreat distance $\alpha$ is an edge of a shielding layer positioned closer to a center of the opening, from among the first shielding layer and second shielding layer.

3. The laminated glass according to claim 2, wherein the second shielding layer is the shielding layer positioned closer to the center.

4. The laminated glass according to claim 1, wherein a retreat distance $\alpha_{top}$ with respect to a top side of an outer peripheral section of the information-acquisition-region is 1 mm or more when the laminated glass is mounted on a vehicle.

5. The laminated glass according to claim 1, wherein a retreat distance $\alpha_{bottom}$ with respect to a bottom side of an outer peripheral section of the information-acquisition-region is 1 mm or more when the laminated glass is mounted on a vehicle.

6. The laminated glass according to claim 1, wherein a retreat distance $\alpha_{side}$ with respect to left and right sides of an outer peripheral section of the information-acquisition-region is 1 mm or more when the laminated glass is mounted on a vehicle.

7. The laminated glass according to claim 1, wherein a thickness of the film is 25 µm or more to 200 µm or less.

8. The laminated glass according to claim 1, wherein, in a plan view, an outer periphery of the information-acquisition-region is entirely surrounded by at least one shielding layer.

9. The laminated glass according to claim 1, wherein, in a plan view, a part of an outer periphery of the information-acquisition-region is surrounded by at least one shielding layer, and wherein a remaining part of the outer periphery is not surrounded by the shielding layer.

10. The laminated glass according to claim 1, wherein the laminated glass includes a display region for HUD (Head-Up Display).

11. The laminated glass according to claim 1, wherein the film is a p-polarized light reflection film.

12. The laminated glass according to claim 1, wherein the information-acquisition-region has a curved surface.

13. The laminated glass according to claim 1, wherein an installation angle of the laminated glass with respect to a horizontal plane of the vehicle is 15 degrees or more to 35 degrees or less.

14. A laminated glass comprising:
a first glass plate on a vehicle exterior side;
a second glass plate on a vehicle interior side;
an intermediate film disposed between the first and second glass plates;
a first shielding layer disposed in a peripheral section on an interior surface of the second glass plate;
a film disposed between the first and second glass plates, and extending, in a plan view, in a region overlapping the first shielding layer; and
an information-acquisition-region positioned within an opening provided through the first shielding layer and the film, the information-acquisition-region allowing a sensor to obtain information, and
wherein a portion of the laminated glass in which the film is disposed and the first shielding layer is not disposed has a visible light reflectivity of 8% or more, or a diffuse reflectivity of 9% or more, and
wherein in the opening, an edge of the first shielding layer retreats, in a plan view, with respect to an edge of the film, and a retreat distance $\beta$ of the edge of the first shielding layer with respect to the end of the film is 1 mm or more.

15. The laminated glass according to claim 14, wherein a retreat distance $\beta_{top}$ with respect to a top side of an outer peripheral section of the information-acquisition-region is 1 mm or more when the laminated glass is mounted on a vehicle.

16. The laminated glass according to claim 14, wherein a retreat distance $\beta_{bottom}$ with respect to a bottom side of an outer peripheral section of the information-acquisition-region is 1 mm or more when the laminated glass is mounted on a vehicle.

17. The laminated glass according to claim 14, wherein a retreat distance $\beta_{side}$ with respect to left and right sides of an outer peripheral section of the information-acquisition-region is 1 mm or more when the laminated glass is mounted on a vehicle.

* * * * *